United States Patent
Kamimura

(10) Patent No.: US 7,639,174 B2
(45) Date of Patent: Dec. 29, 2009

(54) DME GROUND APPARATUS

(75) Inventor: Yukihiro Kamimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 12/129,032

(22) Filed: May 29, 2008

(65) Prior Publication Data

US 2008/0297398 A1 Dec. 4, 2008

(30) Foreign Application Priority Data

May 31, 2007 (JP) .............................. 2007-145283

(51) Int. Cl.
*G01S 13/84* (2006.01)
(52) U.S. Cl. .......................................... 342/47; 342/30
(58) Field of Classification Search .................. 342/42, 342/47, 30, 38, 173, 174
See application file for complete search history.

(56) References Cited

U.S. PATENT DOCUMENTS

| | | | |
|---|---|---|---|
| 3,716,857 A | 2/1973 | Grand | |
| 3,900,848 A | 8/1975 | Mears | |
| 4,010,465 A * | 3/1977 | Dodington et al. | 342/35 |
| 4,028,698 A * | 6/1977 | Miller et al. | 342/48 |
| 4,492,961 A * | 1/1985 | Koller et al. | 342/47 |
| 4,677,439 A | 6/1987 | Skrzypczak | |
| 6,222,480 B1 * | 4/2001 | Kuntman et al. | 342/30 |
| 7,525,474 B2 * | 4/2009 | Carocari et al. | 342/47 |
| 2008/0204303 A1 * | 8/2008 | Kamimura | 342/47 |
| 2008/0238759 A1 * | 10/2008 | Carocari et al. | 342/47 |
| 2008/0297398 A1 * | 12/2008 | Kamimura | 342/38 |
| 2008/0297399 A1 * | 12/2008 | Kamimura | 342/47 |
| 2009/0033541 A1 * | 2/2009 | Kamimura | 342/47 |

FOREIGN PATENT DOCUMENTS

| | | |
|---|---|---|
| GB | 1 445 788 | 8/1976 |
| JP | 63-208782 | 8/1988 |
| JP | 2629612 | 4/1997 |
| JP | 2008298596 A * | 12/2008 |
| JP | 2008298597 A * | 12/2008 |
| JP | 2009014398 A * | 1/2009 |

OTHER PUBLICATIONS

O. Oltu, et al. "Implementation of a Recognition Algorithm in a Reconfigurabile Hardware Using a FPGA Circiut", Semiconductor Conference, IEEE, vol. 2, XP010672898, Sep. 8, 2003, pp. 407-410.

* cited by examiner

*Primary Examiner*—John B Sotomayor
(74) *Attorney, Agent, or Firm*—Oblon, Spivak, McClelland, Maier & Neustadt, L.L.P.

(57) ABSTRACT

In a DME ground apparatus, under the control of a transmission-rate monitoring control unit, the transponder unit decodes an interrogation signal it has received and generates a response signal. The transmission rate at which to transmit the response signal is monitored. If the result of the monitoring indicates that the transmission rate has reached a preset value, the response signal is transmitted from the DME ground apparatus. If the result of the monitoring indicates that the transmission rate has not reached a preset value, squitter pulses are transmitted from the DME ground apparatus.

7 Claims, 2 Drawing Sheets

US 7,639,174 B2

DME GROUND APPARATUS

CROSS-REFERENCE TO RELATED APPLICATIONS

This application is based upon and claims the benefit of priority from the prior Japanese Patent Application No. 2007-145283 filed on May 31, 2007, the entire contents of which are incorporated herein by reference.

BACKGROUND OF THE INVENTION

1. Field of the Invention

The present invention relates to distance measuring equipment (DME) that measures the distance between an aircraft and a ground apparatus. More particularly, the invention relates to a DME ground apparatus that is provided on the ground.

2. Description of the Related Art

The distance measuring equipment (hereinafter referred to as DME apparatus) is a secondary radar system composed of an airborne apparatus and a ground apparatus. The airborne apparatus is mounted in an aircraft. The ground apparatus is provided on the ground and communicates with the airborne apparatus.

In the DME apparatus, the airborne apparatus has an interrogator, and the ground apparatus has a transmitting-receiving device called transponder.

The interrogator transmits interrogation pulses of UHF band (pair pulses) toward the transponder provided in the ground apparatus. The distance between the aircraft and the ground apparatus is measured from the time that elapses until the interrogator receives response pulses (pair pulses) from the transponder after it has transmitted the interrogation pulses. (See, for example, Japanese Patent No. 2,629,612.)

The interrogator sequentially transmits interrogation pulses to the ground apparatus, at random time intervals (though the number of pulses per second is prescribed, e.g., 30 pulses per second). The ground apparatus receives the interrogation pulse signal of a prescribed frequency from the airborne apparatus mounted in the aircraft. The ground apparatus demodulates the interrogation pulse signal, decoding the same, and imparts a preset system-delay time (e.g., 50 μs) to the interrogation pulse signal thus decoded. The ground apparatus then encodes the interrogation pulse signal, generating a response pulse signal. The response pulse signal is transmitted to the aircraft via a specific transmitting system.

On receiving the response pulses, the airborne apparatus mounted in the aircraft demodulates the response pulse signals and calculates the time that has elapsed from the transmission of the interrogation pulse signals to the reception of the response pulse signals. From the time thus calculated, the airborne apparatus generates distance data representing the distance between the aircraft and the DME ground apparatus, by using a prescribed algorithm.

The transponder can respond to the interrogations coming from a plurality of interrogators (mounted in aircrafts).

On receiving interrogation pulses, the DME ground apparatus transmits response pulses as described above. The DME apparatus is obligated to generate random response pulse signals, 700 or more pulses per second on average, to maintain the automatic gain control in the interrogator mounted in each aircraft, even if the DME ground apparatus receives no interrogation pulses from the aircraft.

The random response pulses are called squitter pulses. It is important that squitter pulses should be transmitted randomly so that they may as little correlated as possible with the interrogation pulses that are coming from the aircraft. (See, for example, Jpn. Pat. Appln. Laid-Open Publication No. 63-208782.)

Therefore, the DME ground apparatus has a decoder that receives the interrogation pulses transmitted from the interrogator mounted in the aircraft and decodes these pulses at random time intervals, by using an analog circuit that utilizes the randomness of noise, such as thermal noise made in the receiver provided in the transponder. (Although the time intervals are random, the decoding rate is fixed, for example 1000 pps (pulses pairs per second).

In other words, the transponder transmits a response pulse signal in place of a squitter pulse signal only when it receives an interrogation pulse signal. Hence, the DME ground apparatus keeps transmitting squitter pulse signals and response pulse signals at the rate of 1,000 to 2,700 pps in its normal operating state.

As described above, the transponder of the DME ground apparatus generates and transmits squitter pulses at random time intervals even if it receives no interrogation signals from any aircraft, for the purpose of, for example, maintaining the automatic gain control in the interrogator mounted in each aircraft.

Hitherto, squitter pulses have been generated by an analog circuit that utilizes the randomness of noise, such as thermal noise made in the receiver provided in the transponder. This is because squitter pulses should be transmitted at random time intervals. The analog circuit is susceptible to external noise, however. Consequently, the rate of transmitting the squitter pulses varies, possibly deviated from the appropriate transmission range.

BRIEF SUMMARY OF THE INVENTION

It is an object of the present invention to provide a DME ground apparatus that is free from the influence of thermal noise, can generate squitter pulses, not affected by external pulses, and can therefore transmit squitter pulses at appropriate rates.

In an aspect of the present invention, a DME ground apparatus includes: an aerial unit that receives an interrogation signal from an aircraft; a transponder unit that receives the interrogation signal from the aerial unit, generates a response signal in response to the interrogation signal and generates and transmits squitter pulses; and a monitor control unit that monitors and controls the transponder unit. The transponder unit monitors a transmission rate at which the response signal is transmitted, which has been generated by decoding the interrogation signal received, and, in accordance with a result of monitor, transmits the response signal when the transmission rate reaches a preset value, and transmits the squitter pulses in place of the response signal when the transmission rate does not reach the present value.

DETAILED DESCRIPTION OF THE INVENTION

Figure 1:
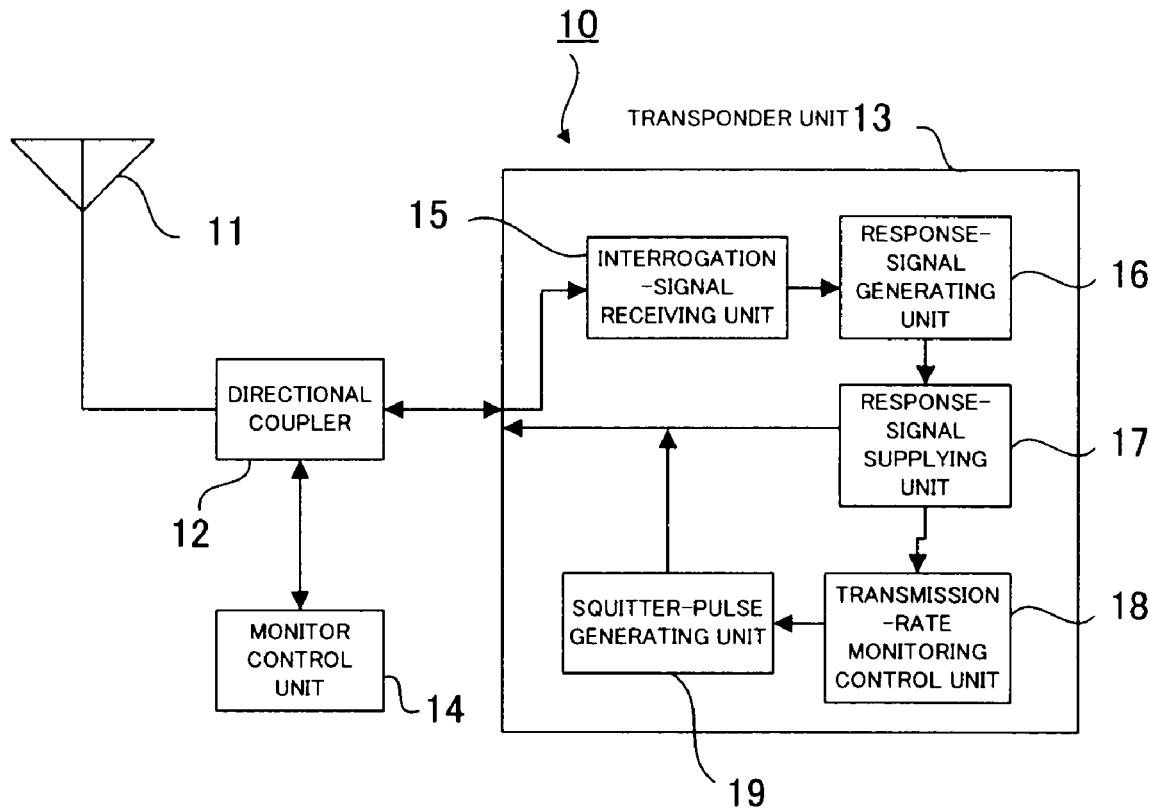
FIG. 1 is a block diagram showing a DME ground apparatus according to an embodiment of the present invention.

Embodiments of the present invention will be described with reference to the accompanying drawings. Any component shown in each drawing, which is identical to an embodiment shown in other drawings, is designated by the same reference numeral and not repeatedly described.

FIG. 1 is a block diagram showing a DME ground apparatus according to an embodiment of the present invention. The DME ground apparatus 10 includes an aerial unit (antenna unit) 11, a directional coupler 12, a transponder unit 13, and a monitor control unit 14. The aerial unit 11 receives interrogation signals from aircrafts (not shown) and transmits response signals. The directional coupler 12 is connected to the aerial unit 11. The transponder unit 13 generates response signals in response to the interrogation signals coming from the aircrafts. The monitor control unit 14 monitors the other components of the DME ground apparatus 10.

The aerial unit 11 is an antenna that catches the interrogation pulse signals coming from the airborne apparatuses mounted in the aircrafts.

The directional coupler 12 is of the type generally used. That is, it is a general-purpose device used in the routing or the like of the microwave transmission, to isolate, separate or combine signals.

The transponder unit 13 includes an interrogation-signal receiving unit 15, a response-signal generating unit 16, a response-signal supplying unit 17, a transmission-rate monitoring control unit 18, and a squitter-pulse generating unit 19.

The interrogation-signal receiving unit 15 receives an interrogation signal transmitted from an aircraft, through the directional coupler (circulator) 12 and decodes the interrogation signal.

The interrogation-signal receiving unit 15 is a decoder circuit that discriminates the interrogation signal the unit 15 has received. The decoder circuit performs automatic threshold control and pulse-width discrimination, thus decoding, thereby discriminating the interrogation signal. The decoder circuit may be a known circuit that first shapes the input signal into a digital pulse by using a threshold adjusted in accordance with a known pulse peak, and then extracts pulses having widths falling within a tolerant range, from the wave-shaped digital pulses, or a circuit that extracts pulses having widths equal to or larger than a specific value, from the shaped pulses.

The response-signal generating unit 16 generates a response signal from the signal decoded in the interrogation-signal receiving unit 15.

Further, the response-signal generating unit 16 imparts a preset system delay time (e.g., 50 μs) to the signal decoded in the interrogation-signal receiving unit 15, and then encodes the signal, generating a response signal.

The response-signal supplying unit 17 supplies the response signal the response-signal generating unit 16 has generated. More specifically, the unit 17 supplies the response signal via the directional coupler 12 to the aerial unit 11. The aerial unit 11 transmits the response signal to the aircraft that has transmitted the interrogation signal.

The transmission-rate monitoring control unit 18 monitors the transmission rate at which the response-signal supplying unit 17 supplies the response signal, and controls this rate.

The squitter-pulse generating unit 19 keeps generating random pulses from which squitter pulses will be generated. If the transmission rate is too low while only the response signal is being transmitted, the squitter-pulse generating unit 19 generates squitter pulses, which are transmitted in place of the response signal.

Figure 2:
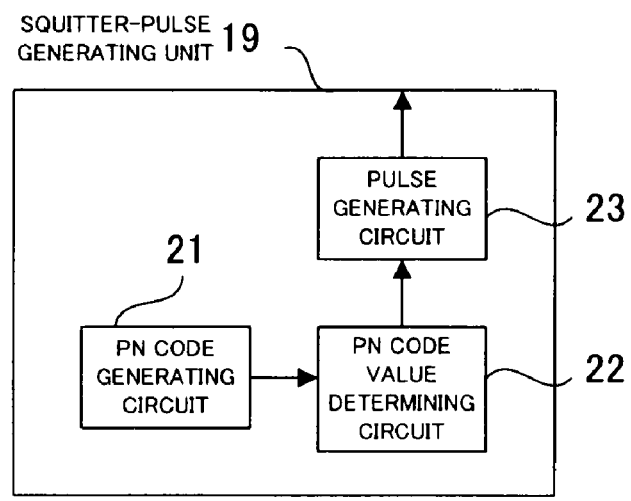
FIG. 2 is a block diagram showing the squitter-pulse generating unit of the DME ground apparatus according to the present invention.

FIG. 2 is a block diagram showing the squitter-pulse generating unit 19 incorporated in the DME ground apparatus 10. As FIG. 2 shows, the squitter-pulse generating unit 19 has a PN code generating circuit 21, a PN code value determining circuit 22, and a pulse generating circuit 23.

The PN code generating circuit 21 is constituted by a shift register, which is a digital circuit. The circuit 21 generates a pseudo noise (PN) code (composed of pseudo-noise random pulses). The PN code value determining circuit 22 combines the PN code bits output from the PN code generating circuit 21, providing a PN code value (integral value) and compares the PN code value with a prescribed threshold value. The pulse generating circuit 23 generates a transmission pulse when the PN code value exceeds the threshold value.

Figure 3:
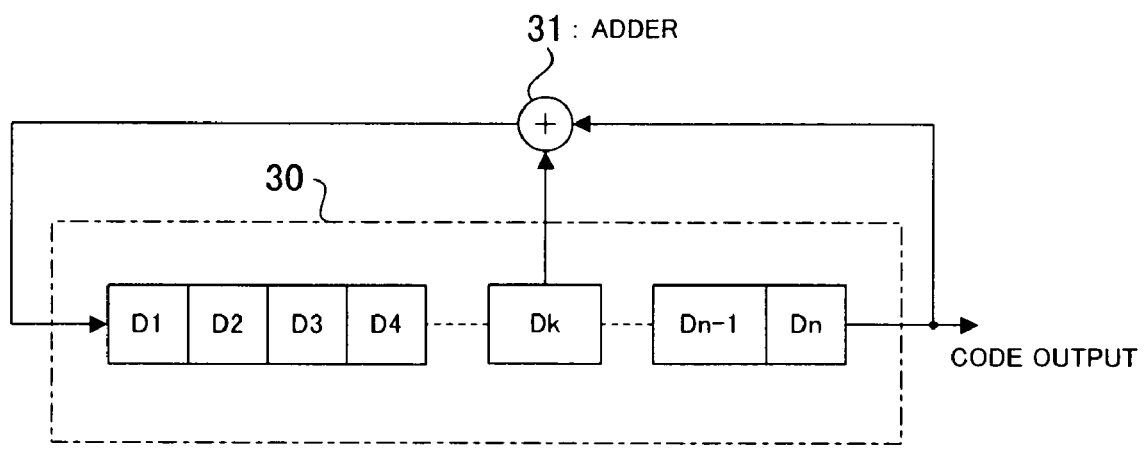
FIG. 3 is a diagram explaining an PN code generating circuit that may be used in the squitter-pulse generating unit of the DME ground apparatus according to the present invention.

FIG. 3 is a diagram explaining the PN code generating circuit 21 that includes, for example, a shift register 30. An adder 31 feeds back to the first delay state a binary logic sum or a binary logic exclusive sum of the logic values of the last delay stage Dn and middle delay stage Dk of the shift register 30. An appropriate delay stage, but not the last, is selected as the middle stage in accordance with the number of the delay stages of the shift register 30. The PN code generating circuit 21 can therefore generate the longest code train (m-code train, wherein code elements remain arranged in different order until the $(2D_k-1)$th code. The output of the PN code generating circuit 21 is used in the phase modulation of carrier wave.

The monitor control unit 14 receives, via the directional coupler 12, an interrogation pulse signal at a prescribed level, which is similar to the signal coming from the DME airborne apparatus. Further, the monitor control unit 14 receives, via the directional coupler 12, a signal that has been output from the response-signal supplying unit 17 as response pulse signal by the transponder unit 13. From this response pulse signal, the unit 14 always monitors the operating state of the DME ground apparatus 10.

How the DME ground apparatus 10 so configured as described above operates will be explained.

Assume that the aerial unit 11 receives an interrogation signal from the interrogator provided in an aircraft. The interrogation signal is input to the directional coupler 12. From the directional coupler 12, the interrogation signal is input to the interrogation-signal receiving unit 15 of the transponder unit 13. The interrogation-signal receiving unit 15 decodes the interrogation signal.

In accordance with the result of the decoding performed in the interrogation-signal receiving unit 15, the response-signal generating unit 16 imparts a preset system-delay time (e.g., 50 μs) to the interrogation signal transmitted from the interrogator provided in the aircraft. The interrogation signal is encoded again, providing a response signal.

The response signal generated in the response-signal generating unit 16 is supplied by the response-signal supplying unit 17 to the directional coupler 12. At this point, the transmission-rate monitoring control unit 18 monitors the transmission rate at which the response-signal supplying unit 17 supplies the response signal.

If the transmission rate at which the response-signal supplying unit 17 supplies the response signal has reached a preset value, the transmission-rate monitoring control unit 18 controls the response-signal supplying unit 17. Controlled by the unit 18, the response-signal supplying unit 17 supplies the response signal to the aerial unit 11 via the directional coupler 12. The aerial unit 11 transmits the response signal to the aircraft.

Thus, the interrogation-signal receiving unit 15 receives and demodulates the interrogation pulse signal having a prescribed frequency and transmitted from the DME airborne apparatus mounted in an aircraft. The interrogation signal is then decoded. The response-signal generating unit 16 imparts the preset system-delay time (e.g., 50 μs) to the interrogation signal thus decoded. The interrogation signal is thereby encoded again, providing a response pulse signal. The response-signal supplying unit 17 supplies the response pulse signal to the aerial unit 11 via the directional coupler 12. Finally, the aerial unit 11 transmits the response signal to the aircraft.

In the airborne apparatus mounted in the aircraft, the response pulse signal is received and demodulated, thereby measuring the time that elapses until the airborne apparatus receives the response pulse signal after it has transmitted the interrogation pulse signal. From the time thus measured, the airborne apparatus acquires distance data that represents the distance between it and the DME ground apparatus 10.

On the other hand, if the transmission rate monitored, at which the response-signal supplying unit 17 supplies the response signal, is lower than the preset value, the transmission-rate monitoring control unit 18 controls the response-signal supplying unit 17, inhibiting the unit 17 from supplying the response signal. Instead, the unit 18 controls the squitter-pulse generating unit 19, which generates squitter pulses.

In the squitter-pulse generating unit 19, the squitter pulses generated by the PN code generating circuit 21, which is an digital circuit, are supplied to the PN code value determining circuit 22 determines the values of the squitter pulses. The squitter pulses are supplied to the pulse generating circuit 23, and thence to the aerial unit 11 via the directional coupler 12. The aerial unit 11 transmits the squitter pulses to the aircraft.

Hence, in the DME ground apparatus 10 of the embodiment, the squitter-pulse generating unit 19 generates squitter pulses that are not influenced by thermal noise at all. In other words, the squitter-pulse generating unit 19 is not susceptible to external pulses. The DME ground apparatus 10 can therefore reliably transmit squitter pulses, always at a prescribed rate.

Moreover, to change the random pattern of the squitter-pulse generating timing, a digital circuit may be configured to change the pattern of generating PN codes. In this case, the squitter pulses the DME ground apparatus 10 transmits can be prevented from interfering with the squitter pulses transmitted from any nearby DME ground apparatus.

In the present embodiment, the squitter-pulse generating means is free from the influence of thermal noise and can therefore generate squitter pulses not affected by external pulses. Thus, the embodiment can always transmit squitter pulses at an appropriate transmission rate.

It should be noted that the present invention is not limited to the embodiment described above. The components of the embodiment can be modified in various manners in reducing the invention to practice, without departing from the sprit or scope of the invention. Further, the components of the embodiment described above may be combined, if necessary, in appropriate ways, thereby to make different inventions. Still further, some of the components of the embodiment may be omitted. Moreover, the components of possible different embodiments of the invention may be combined in any desired fashion.

What is claimed is:

1. A DME ground apparatus comprising:
    an aerial unit that receives an interrogation signal from an aircraft;
    a transponder unit that receives the interrogation signal from the aerial unit, generates a response signal in response to the interrogation signal and generates and transmits squitter pulses; and
    a monitor control unit that monitors and controls the transponder unit, wherein
    the transponder unit monitors a transmission rate at which the response signal is transmitted, which has been generated by decoding the interrogation signal received, and, in accordance with a result of monitor, transmits the response signal when the transmission rate reaches a preset value, and transmits the squitter pulses in place of the response signal when the transmission rate does not reach the present value.

2. The DME ground apparatus according to claim 1, wherein
    the transponder unit has an interrogation-signal receiving unit that receives the interrogation signal from the aircraft and decodes the interrogation signal, a response-signal generating unit that generates a response signal from the signal decoded by the interrogation-signal receiving unit, a response-signal supplying unit that supplies the response signal generated by the response-signal generating unit, a transmission-rate monitoring control unit that monitors and controls transmission rate at which the response signal is supplied from the response-signal supplying unit, and a squitter-pulse generating unit that generates squitter pulses.

3. The DME ground apparatus according to claim 2, wherein
    the interrogation-signal receiving unit is a decoder that performs automatic threshold control and pulse-width discrimination, thus decoding, thereby discriminating the received interrogation signal.

4. The DME ground apparatus according to claim 2, wherein
    the response-signal generating unit imparts a preset system-delay time to the signal decoded by the interrogation-signal receiving unit, and encodes the signal, thereby generating a response signal.

5. The DME ground apparatus according to claim 2, wherein
    the squitter-pulse generating unit keeps generating random pulses from which squitter pulses are generated.

6. The DME ground apparatus according to claim 5, wherein
    the squitter-pulse generating unit generates random pulses from a random signal obtained from a digital circuit.

7. The DME ground apparatus according to claim 6, wherein
    the digital circuit is a PN code generating circuit that generates an PN code composed of pseudo noise pulses and pseudo random pulses.

* * * * *